July 31, 1951 L. F. EMBREE ET AL 2,562,605
FISHING TACKLE
Filed June 10, 1948
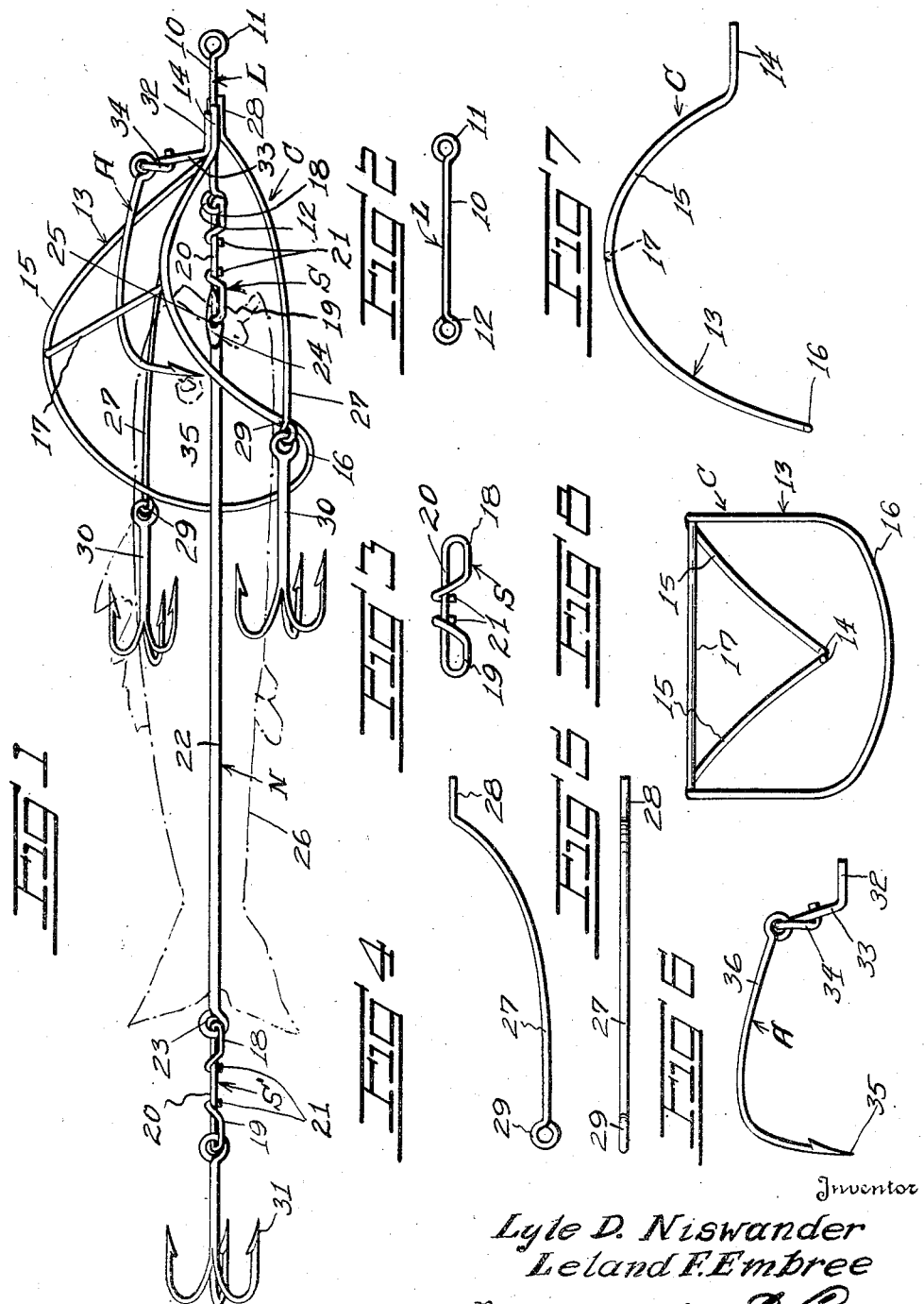
Inventor
Lyle D. Niswander
Leland F. Embree
By Wilfred E. Lawson
Attorney Patented July 31, 1951

2,562,605

UNITED STATES PATENT OFFICE 2,562,605

FISHING TACKLE

Leland F. Embree, Ames, and Lyle D. Niswander, Des Moines, Iowa

Application June 10, 1948, Serial No. 32,128

1 Claim. (Cl. 43—44.4)

This invention relates to fishing tackle and more particularly to a device for securing a minnow or the like inside a wire cage and the primary object of the invention is to provide a device of the character indicated comprising a needlelike link adapted to be threaded through the bait and having a fish hook secured to its end adjacent the tail of the minnow.

Another object of the invention is to attach the forward end of the needlelike link to the front portion of the wire cage and connect an anchor hook to the front portion of said cage so that said anchor is adapted to engage the minnow through or behind its head.

A further object of the invention is to provide a device of the character indicated which is equipped with a plurality of fish hooks so distributed about it that a fish striking at the bait will be caught on one or the other of the hooks.

A still further object of the invention is to provide a device of the above stated character, the wire cage of which is equipped with a top member and a bottom member cooperating with each other to hold the minnow in life-like position inside the cage.

Other objects of the invention not specifically mentioned may appear in the following specification describing the invention with reference to the accompanying drawing illustrating a preferred embodiment of the invention. It is however, to be understood that the invention is not to be limited or restricted to the exact construction and combination of parts described in the specification and shown in the drawing, but that changes and modifications may be made, which fall within the scope of the claim appended hereto.

The invention consists in the details of construction and in the combination of the several parts of my improved fishing tackle whereby certain advantages are attained, as will be hereinafter more fully set forth.

In order that my invention may be better understood, I will now proceed to describe the same with reference to the accompanying drawing, wherein:

Figure 1 is a perspective view of a minnow securing device constructed in accordance with an embodiment of the invention;

Figures 2, 3 and 4 are detail views.

Figure 5 is a view in side elevation of the part shown in Figure 4.

Figure 6 is a fragmentary elecational view of the anchor hook as herein comprised;

Figure 7 is a detail view in side elevation of the cage detached;

Figure 8 is a detail view in front elevation of the cage detached.

The device for securing a minnow or the like in life-like position comprises a wire cage, generally designated C, which includes a forward wire link L having a straight shank 10, on the front end of which an eye 11 is formed and on the rear end of which another eye 12 is arranged. The cage C further includes a main portion 13 made from a continuous piece of wire of suitable material and size, shaped to have a pair of straight forward end portions 14. From the rear end of each of these forward portions the wire extends rearwardly in an upwardly and outwardly curved parabola or similar curve as shown at 15. The two rear ends of the curved portions 15 are connected with each other by a laterally extending shallow downwardly curved bottom portion 16. A straight top member 17 made from the same material as the cage portion 13 extends between the two curved side portions 15 at their highest points and is firmly secured to said portions by means of soldering, welding or the like. The two straight forward portions 14 are rigidly mounted on the shank 10 of the forward wire link L by welding or the like. The reference character S designates a snap hook link forming an operative coupling which has a front eye 18 and a rear eye 19. Both of these eyes are formed by bending the end portions of a straight piece of wire 20 to extend parallel to the main portion, by forming a hook 21 on each end portion and by engaging the main portion releasably with the hooks. The link or coupling S is connected to the rear eye 12 of the front link L by releasing the front snap hook 21 from the main portion of the snap hook link, threading the hook through the rear eye 12 and securing the front hook 21 again on the snap hook link main portion.

The reference character N designates an elongated needle link which has a comparatively long shaft 22, at the rear end of which an eye or hole 23 is formed. The other end portion of the link N is flattened and pointed as shown at 24 in Figure 1. In the flattened end portion 24 a hole 25 is provided and the needle link is threaded lengthwise through a minnow or similar bait 26 by forcing it either through the mouth of the minnow rearwardly through its body or by forcing it from the tail end of the minnow through the body, so that the pointed end portion 24 may be located at the mouth or tail end of the minnow. The needle link N is removably secured to the rear eye 19 of the snap hook link S by threading the rear hook 21 through the eye or hole 25 in the needle link N, which is located adjacent to the head of the minnow. The needle link is arranged so that it extends between the top member 17 and the bottom portion 16 of the cage C, which keeps the minnow 26 on the needle link N in an approximately horizontal life-like position. At each side of the cage C an outwardly or laterally curved rib 27 is provided which has a straight forward end portion 28 secured by soldering, welding or the like to the shaft 10 of the front link L so that each rib extends outwardly and rearwardly along the main portion 13 of the cage C. The rear end portion of each rib 27 is formed into an eye 29, to which a fishing hook 30 of any desired conventional kind is attached. To the eye 23 of the rear end portion of the needle link another conventional fish hook 31 is secured in any desired manner, but preferably by means of a snap hook link S', similar to the link S hereinbefore referred to.

To prevent the bait 26 from slipping rearwardly on the needle link N an anchor hook A is provided. An upwardly extending anchor piece 33 has a straight base portion 32 welded or otherwise firmly secured to the shank 10 of the front link L and at the upper end of this piece 33 is a snap hook eye 34 similar to an eye of the link S described above. The anchor hook A is made from a conventional single point fish hook by bending the hook so that the point 35 extends at an approximately right angle to the shank 36 of said fish hook. The anchor hook A is secured to the snap hook eye 34 of the anchor piece 33 by threading the end of the opened eye 34 through the eye of the hook so that the point 35 of said hook can be forced into the head of the minnow on the needle link or into the body thereof back of the head.

The above described device is adapted to be secured to a snell or a fishing line by means of the front eye 11 of the front link L and the hooks arranged on and about said device enhance the chances of catching any fish striking at the bait minnow mounted on the needle link.

We claim:

A bait holder for minnows and the like, comprising a shaft adapted to be forced lengthwise forwardly through the bait and having its rear end provided with an eye and its forward end with a flattened point having an aperture therein, the forward end of said shaft being adapted to terminate adjacent to the mouth of the bait, a link extending forwardly from said shaft, an operative coupling between the rear end of the link and said aperture, said link having its outer end provided with an eye, oppositely disposed arcuate elements carried by said link and extending rearwardly therefrom to support the bait in a natural swimming position therebetween, other oppositely disposed arcuate elements extending rearwardly from said link and having the rear ends thereof each provided with an eye, a hook connected with each of the last named eyes and adapted to be engaged in the adjacent sides of the bait, a second coupling having one end engaged with the first named eye, and a hook connected with the opposite end of said second coupling.

LELAND F. EMBREE.
LYLE D. NISWANDER.

REFERENCES CITED

The following references are of record in the file of this patent:

UNITED STATES PATENTS

| Number | Name | Date |
| --- | --- | --- |
| 479,575 | Skinner | July 26, 1892 |
| 533,652 | Kittle | Feb. 5, 1895 |
| 772,807 | Ketchum | Oct. 18, 1904 |
| 1,461,246 | Lent | July 10, 1923 |
| 1,613,113 | Leu | Jan. 4, 1927 |
| 2,150,874 | Wagner | Mar. 14, 1939 |

FOREIGN PATENTS

| Number | Country | Date |
| --- | --- | --- |
| 154,490 | Great Britain | Dec. 2, 1920 |